(12) United States Patent
Gokam et al.

(10) Patent No.: US 10,678,440 B2
(45) Date of Patent: Jun. 9, 2020

(54) HOST-DEFINED I/O STORAGE CONTROL BASED ON APPLICATION INSTANCE AND/OR CONTROL GROUP

(71) Applicant: EMC IP Holding Company LLC, Hopkinton, MA (US)

(72) Inventors: Kurumurthy Gokam, Bangalore (IN); Arieh Don, Newton, MA (US); Gopinath Marappan, Coimbatore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 16/045,889

(22) Filed: Jul. 26, 2018

(65) Prior Publication Data
US 2020/0034038 A1 Jan. 30, 2020

(51) Int. Cl.
*G06F 3/06* (2006.01)
(52) U.S. Cl.
CPC .............. *G06F 3/061* (2013.01); *G06F 3/067* (2013.01); *G06F 3/0655* (2013.01)
(58) Field of Classification Search
CPC ......... G06F 3/061; G06F 3/067; G06F 3/0655
See application file for complete search history.

(56) References Cited

U.S. PATENT DOCUMENTS

| 9,792,196 | B1 * | 10/2017 | Ismael | G06F 11/362 |
| 2009/0276705 | A1 * | 11/2009 | Ozdemir | G06K 9/00335 715/708 |
| 2019/0065177 | A1 * | 2/2019 | Khoongumjorn | G06F 9/4488 |

OTHER PUBLICATIONS

Thomas F. O'Neill, et al., U.S. Appl. No. 15/963,398, filed Apr. 26, 2018, "Time Dependent Service Level Objectives".
Stephen Smaldone, et al., U.S. Appl. No. 15/876,143, filed Jan. 20, 2018, "Meeting Backup Window Requirements While Managing Storage Array Backup Load".

* cited by examiner

*Primary Examiner* — Hiep T Nguyen
(74) *Attorney, Agent, or Firm* — Muirhead and Saturnelli, LLC

(57) ABSTRACT

I/O storage processing behavior is controlled on a storage system based on an application instance of an I/O request. I/O storage processing behavior may be associated with application instances on a host by creating a table or other data structure that assigns identifiers to each application instance and specifies associate behavior(s) with the application instance. The table may associate behavior to application instances based on logical groupings of application instances, which may be based on existing defined groups or other logical entities, for example, a container or VM. A host may communicate the table to a storage system, and the storage system may store information from the table. An I/O request on the host may be tagged with an ID from the table, and sent to the storage system, which controls the I/O storage processing of the I/O request according to the tagged ID.

20 Claims, 9 Drawing Sheets

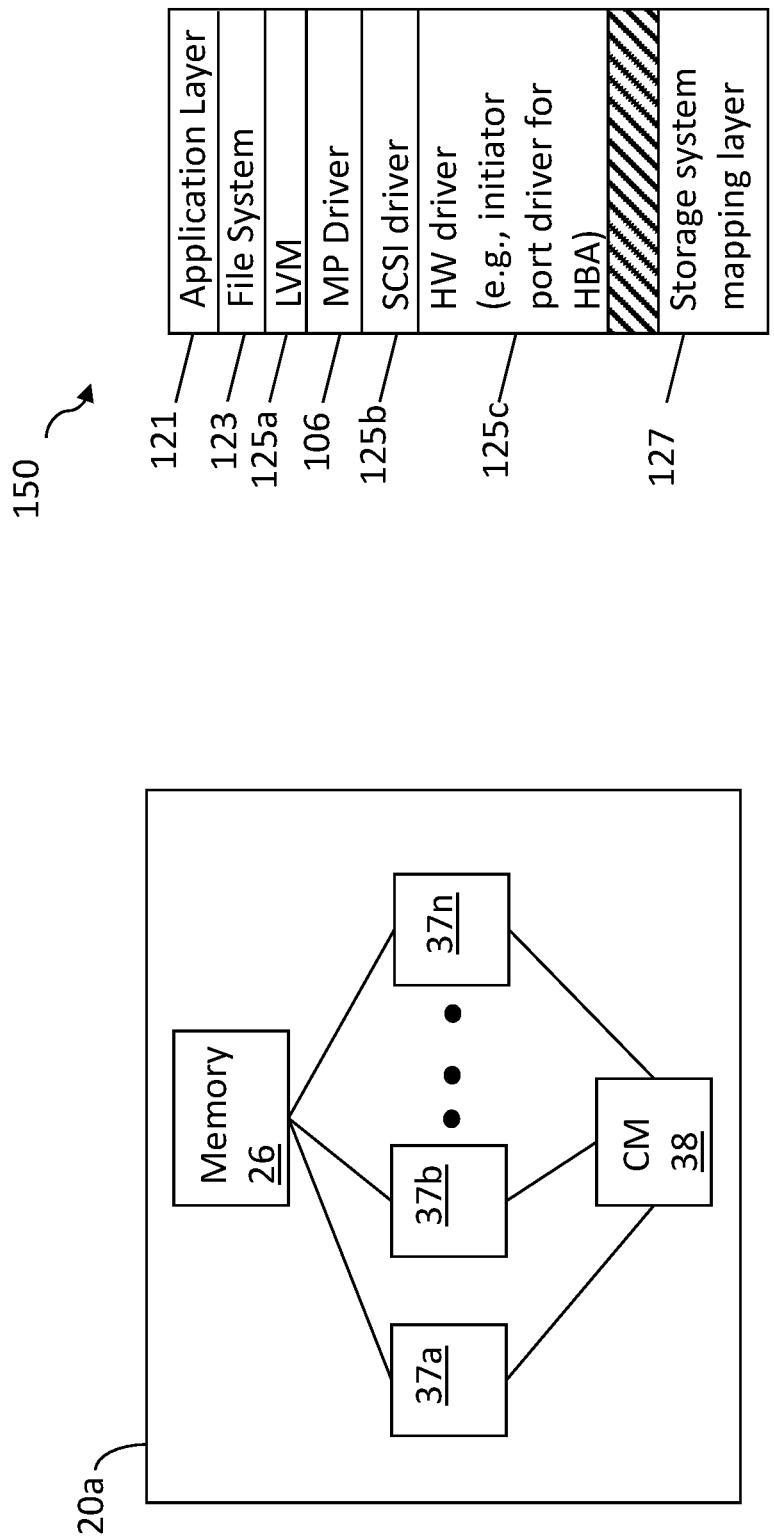

| Control Group | Application Instance | Control-Group Type | Instance Control ID | Priority | Other Behavior | Other Info |
|---|---|---|---|---|---|---|
| Sales | LOGWRITER_SALES | User-defined | 1 | 1 | snap | |
| Sales | DBWRITER_SALES | User-defined | 2 | 1 | don't snap | |
| Marketing | LOGWRITER_MKTG | User-defined | 3 | 2 | snap | |
| ... | | | ... | | | |
| Marketing | DBWRITER_MKTG | User-defined | 4 | 3 | snap | |
| HR Production | HR Production | VM | 5 | 2 | snap | |
| HR Backup | HR Backup | VM | 6 | 4 | Don't snap | |

FIG. 5

| Application Instance | Instance Control ID |
|---|---|
| LOGWRITER_SALES | 1 |
| DBWRITER_SALES | 2 |
| LOGWRITER_MKTG | 3 |
| ... | ... |
| DBWRITER_MKTG | 4 |
| HR Production | 5 |
| HR Backup | 6 |

FIG. 6

| Host | Instance Control ID | Priority | Other Behavior | Other Info |
|---|---|---|---|---|
| First Floor Server | 1 | 1 | snap | |
| First Floor Server | 2 | 1 | don't snap | |
| First Floor Server | 3 | 2 | snap | |
| ... | | | | |
| First Floor Server | 4 | 3 | snap | |
| First Floor Server | 5 | 2 | snap | |
| First Floor Server | 6 | 4 | Don't snap | |
| Second Floor Server | 1 | 2 | Store in Tier 2 | |
| Second Floor Server | 2 | 3 | Store in Tier 2 | |
| Second Floor Server | 3 | 1 | Store in Tier 1 | |

FIG. 10

HOST-DEFINED I/O STORAGE CONTROL BASED ON APPLICATION INSTANCE AND/OR CONTROL GROUP

BACKGROUND

Technical Field

This application generally relates to data storage and, in particular, satisfying performance objectives for applications utilizing data storage resources.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC. These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

SUMMARY OF THE INVENTION

In some embodiments, for a system including a storage system and at least one host system having a plurality of instances of applications executing thereon, a method includes associating a desired behavior with each application instance, and, for each of the plurality of application instances, controlling processing of I/O operations for the application instance on the storage system based on the desired behavior associated with the application instance. The system may further include a plurality of logical groupings of one or more of the plurality of application instances, where, for the one or more application instances, the desired behavior is associated with the application instance based at least in part on the logical grouping of which the application instance is a member. One or more of the logical groupings may correspond to a container or virtual machine, and associating a desired behavior may include associating a priority with each application instance. Associating a desired behavior with each application instance may include creating a first table including a plurality of entries, each entry corresponding to one of the application instances and specifying the desired behavior. Each application instance may be associated with the respective desired behavior on the at least one host system, and the method may further include communicate the association of application instances with the respective desired behaviors to the storage system. The methods may further include receiving on the first host system an I/O request for a first of the plurality of application instances, the I/O request specifying an I/O operation, determining a value corresponding to the association of the first application instance and the respective desired behavior of the first application instance, and sending an I/O communication from the at least one host to the storage system, the I/O communication including the I/O operation and the determined value. The method may further include the storage system determining the respective desired behavior from the communicated value, and the storage system processing the I/O operation according to the respective desired behavior.

In some embodiments, a computer network is provided including a storage system and at least one host system having a plurality of instances of applications executing thereon. The system may include one or more processors; and a memory including code stored thereon that, when executed, performs the above-described method.

In some embodiments, one or more computer-readable media, for example, non-transitory computer-readable media, are provided for a system including a storage system and at least one host system having a plurality of instances of applications executing thereon. The computer-readable media has software stored thereon comprising executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 2B is a block diagram illustrating an example of logical internal communications between directors and memory of the data storage system of FIG. 2A according to embodiments of the invention;

FIG. 4 is a block diagram illustrating an example of a plurality of logical layers of a combination of a host system and a data storage system for processing an I/O request, according to embodiments of the invention;

FIG. 5 illustrates an example of a data structure for associating I/O storage processing behavior with application instances and/or control groups, according to embodiments of the invention;

FIG. 6 illustrates an example of a data structure for indexing instance control IDs based on application instance IDs, according to embodiments of the invention;

FIG. 10 illustrates an example of a data structure for associating I/O storage processing behavior with host application instances, according to embodiments of the invention;

DETAILED DESCRIPTION OF EMBODIMENTS

Figure 1:
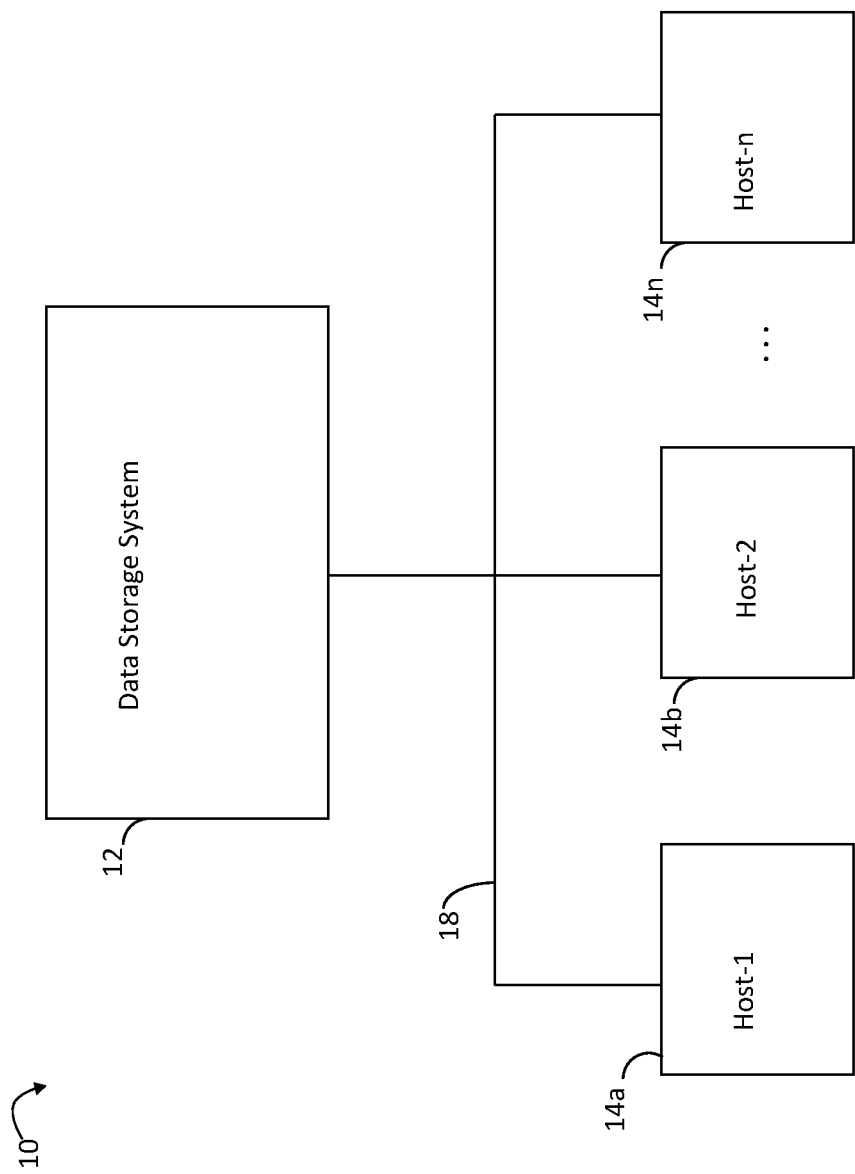
FIG. 1 is a block diagram illustrating an example of a system according to embodiments of the invention.

Storage groups (SGs) are logical constructs that can be defined on a storage system to associate one or more host applications with one or more storage devices (e.g., logical devices and/or physical devices) on the storage system, and can be used to associate I/O storage processing behavior with applications. For example, a host system administrator or host application administrator can manually communicate the applications and desired behaviors to the storage system administrators, and the storage system administrator can create the SGs. This paradigm is labor intense and susceptible to human error, in the communication between the administrators and in the implementation by the storage administrator. These potential drawbacks may be amplified each time a new logical device and/or host application is added to the system or each time a host or application administrator wants to make changes to I/O storage processing behavior for one or more applications. Further, while SGs are used to associate I/O storage system behavior with applications, SGs are not used to associate I/O storage system behavior at the granularity of application instances.

On the host side, some host systems have the ability to aggregate I/O processes into groups, which may be referred to as "control groups," which in some cases may correspond to a discrete, virtualized, self-executable software package like a container (e.g., a Docker), VM or the like. Control groups may be used to control or manage compute and I/O resources (e.g., CPU or operating system (OS) resources) on the host system, for example, by establishing priority between the control groups; i.e., by designating priority values for the control groups. That is, the host system may throttle (i.e., accelerate) compute and I/O processing of processes based on the control group. For example, a host may define one container to include I/O processes being used in production environments, and a separate container for I/O processes related to backup activities, as assign more priority or weight to the production applications. However, the storage system is not aware of these control groups, but rather is limited to processing I/O based on SGs that may be defined to correlate to applications, but not I/O processes.

Defined herein are systems and techniques for controlling I/O storage processing behavior on a storage system based on an application instance that issued an I/O request, and/or the control group to which the application instance belongs.

I/O storage processing behavior may be associated with application instances on a host, for example, by creating a table or other data structure that assigns control identifiers (IDs) to each application instance and specifies one or more values that associate behavior with the application instance. Such a table may be referred to herein as a "instance control table" or "control table." Each of the one or more values (often referred to herein as "behavior values") may be as simple as a priority value relative to other application instances or a service level value, or may explicitly specify a prescribed behavior for the application instance (e.g., perform snapshots, or do not perform snapshots). Behavior may be associated with application instances on an instance-by-instance basis, or instances may be grouped together into logical groupings, e.g., control groups, and behavior may be associated with the control group. For example, one or more entries of an instance control table may associate an instance control ID with a control group ID (e.g., name), and the instance control ID and behavior value(s) may apply to all application instances belonging to the control group. The instance control table itself may have an entry for each application instance belonging to the control group, or the instance control table may not list any application instances, but rather one or more separate tables or indices may associate each application instance with the control group to which it belongs.

The control groups may be based on, or derived from, existing defined groups or other logical entities, for example, a discrete, virtualized, self-executable software package like a container (e.g., a Docker), VM or the like. In such embodiments, the logical entity (e.g., container or VM) name may serve as the control group identifier in the instance control table, and an instance control ID may be specified therefor in the table. By using VMs and containers, I/O storage processing behavior (e.g., priority) can be correlated to the same or related behavior implemented on the host for the VM or container. For example, if VMs or containers are each afforded relative priority with respect to compute (e.g., CPU or OS) resources on the host, the same relative priorities can be specified for storage resources on the storage system.

In some embodiments, from the perspective of an instance control table and I/O processing performed in association therewith, a VM, container or other discrete, virtualized, self-executable software package may be considered and treated as an application instance. For example, in some embodiments, the host OS (or other controlling software running directly on the host hardware) may identify each VM or container as a single process or thread running on the host OS. In such cases, the host OS, and thus the multi-path driver or other host component creating the instance control table and/or using it to tag I/O (described in more detail elsewhere herein), may have no visibility into what actual applications are running inside the VM or container, and no visibility into what application within the VM or container issued an I/O request. That is, in such embodiments, the OS (or the like) may view VMs and containers as it views processes for application instances running independent of a VM or container. In such embodiments, for an entry representing the VM or container in an instance control table that includes logical group identifiers, the same VM or container ID (e.g., name) may be specified in the instance control table for both the control group identifier and application instance identifier; or only one of these fields may be populated with the VM or container ID, and the system may be configured to understand this to mean that the entry is for a VM or container. In some embodiments, the instance control table may include a control group type column for specifying a type (e.g., VM, container, user-defined, etc.) for each control group entry.

In embodiments in which behavior is associated with application instances on an instance-by-instance basis, the instance control table may list application instances, either in addition to the control group to which the application instance belongs or without any control group specified (e.g., when control groups are not used). In either scenario, the behavior is specific to an application instance, and different application instances of a same control group may have different control IDs and/or behavior values specified.

Each instance control table entry may include any of a variety of other information as well, including, for example, additional information about the application that spawned the instance (e.g., vendor, version, etc.), associated performance level objectives (e.g., SLOs), one or more application and/or host system administrators or other personnel associated with the application instance, etc.

The associations between I/O behaviors and application instances may be communicated from a host to one or more storage systems (e.g., storage arrays). For example, the host may communicate an instance control table to one or more storage systems. The storage system then may create its own instance control table based on the instance control table communicated from the host. The storage system instance control table may include some or all of the information included in the host instance control table, and may include additional information. For example, as the storage system may be serving multiple host systems and receive instance control tables from each of them, the storage system table may specify an identifier of the host system for each table entry to indicate the host system to which the application instance entry applies. In some embodiments, each entry of the storage system instance control table includes a host system identifier, a control ID and one or more behavior values, and may include one or more other items of information. A user, e.g., a storage administrator, may decide what other information to include in each entry of the table. For example, it may be desirable to include information about the application or one or more application or host administrators associated with the application instance identified by the instance control ID.

In embodiments of the invention in which control groups are employed, control groups themselves may be aggregated in other data structures, which may establish a hierarchy of control groups, and define relative weights and priorities between the control groups or groups of control groups. Information from such data structures may be used to establish priority values and other behavior values between control groups and/or application instances in control group tables.

In some embodiments of the system described herein, an I/O request specifying an I/O operation is made by a host application, and the host (e.g., a multi-path driver thereon) may identify the application instance of the I/O request (e.g., from the host OS), determine the instance control ID associated with the application instance (e.g., from an instance control table or index related thereto), create an I/O communication including the I/O operation and the instance control ID (i.e., "tag" the I/O communication with the instance control ID) and send the I/O communication to the target storage system. The storage system then may use the instance control ID to look-up any behavior values (e.g., priority) for the instance in its own instance control table, based on the host ID and instance control ID, and implement one or more I/O storage behaviors associated with the behavior values for the I/O operation.

As is described in more detail elsewhere herein, a host system (e.g., 102) may communicate the host control table 500 (and other data structures described herein) to one or more storage systems (e.g., 120), which then may use the information contained in the table 500 to control I/O storage processing behavior of I/O operations for host application instances. The association of I/O storage processing behavior with application instances and/or control groups, e.g., in the form of a control table and/or one or more other data structures, shared between a host system and a storage system, may be considered as a contract or agreement between the host system and a storage system about how to process I/O operations for host application instances.

The system described herein enables I/O storage processing behavior to be associated at the granularity of application instances, and enables these behaviors to be defined on a host (e.g., by a system or application administrator or other personnel) and for such behaviors to be implemented for host I/O requests in an automated fashion on the storage system without the need for manual communication between host and storage system administrators and other personnel. Thus, the system described herein may provide a host or application administrator more control over the I/O behavior (e.g., performance) of its applications, for example, per control groups defined on the host. Such control groups may be defined according to existing business units, or logical entities such as, for example, VMs and containers. Thus, a host application or system administrator can correlate I/O storage processing behaviors to these existing groups and logical constructs, for example, using an instance control table as described herein.

While embodiments of the system described herein control I/O storage processing behavior based on application instance, it should be appreciated that the system is not so limited. In some embodiments, I/O storage processing behavior is based on control groups, not application instances (except in the sense that application instances are members of the control groups) as described in more detail elsewhere herein.

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
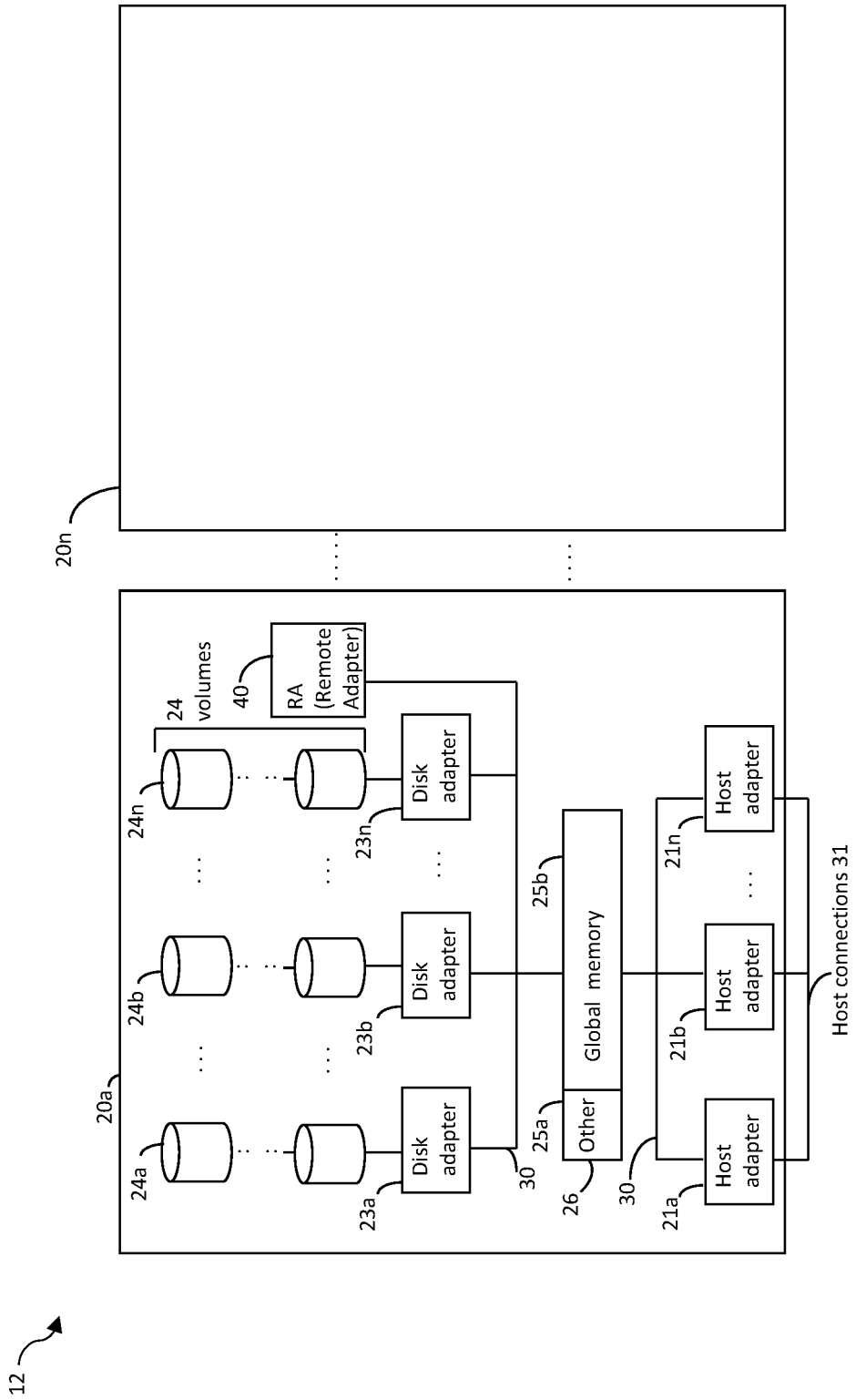
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
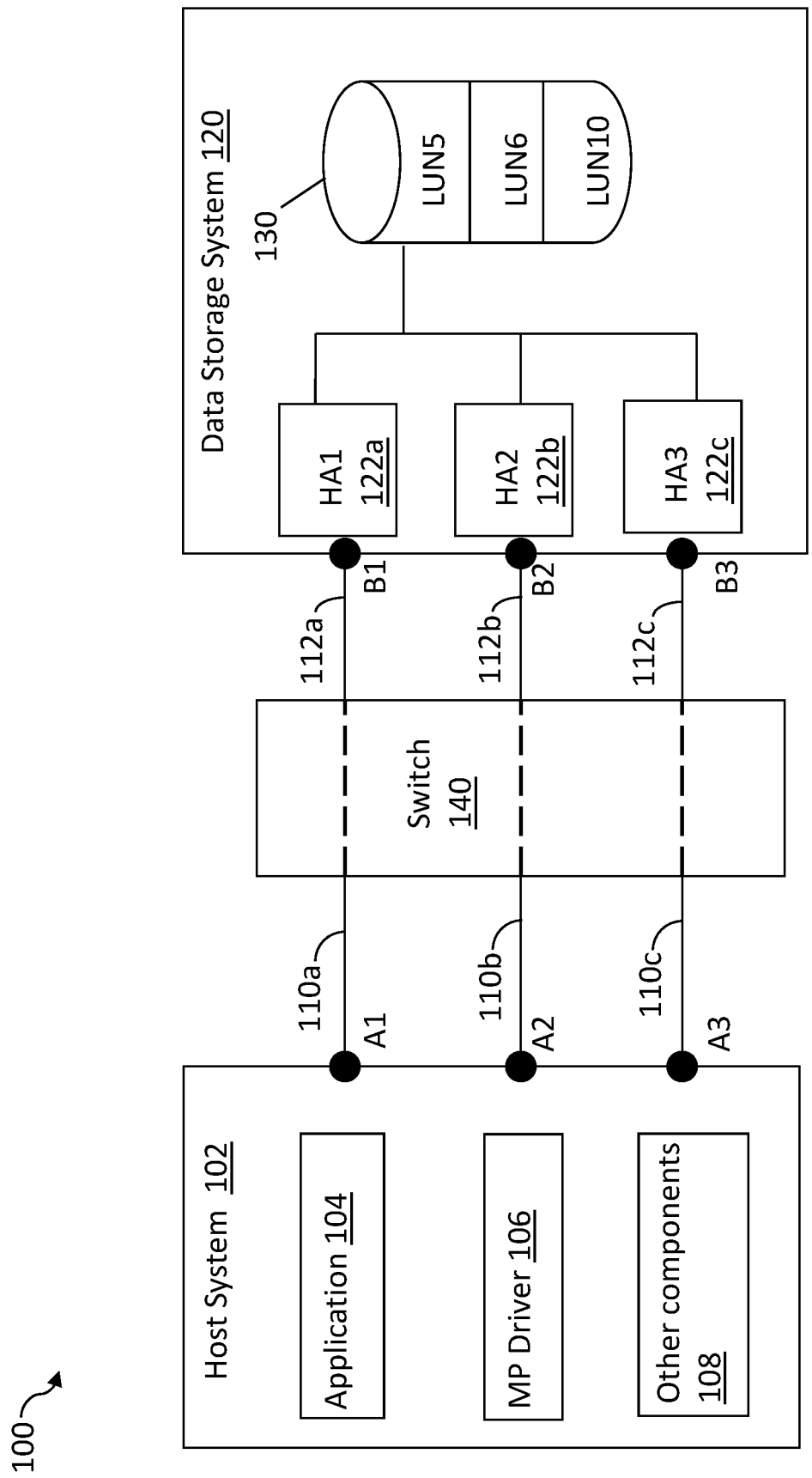
FIG. 3 is a block diagram illustrating an example of a system including a host system communicatively coupled to a data storage system via multiple I/O paths, according to embodiments of the invention.

FIG. 3 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 12 and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include 3 LUNs—LUN5, LUN6 and LUN10. It should be noted that the system 100 includes only a single host system 102, single physical device 130 with 3 LUNs, a single data storage system 120, and a single switch for purposes of simplicity to illustrate the techniques herein. For example, each of the LUNs may be configured to have storage provisioned from multiple different physical devices rather than a single physical device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LUNs of device 130, configured to be accessible to the host system 102 over multiple I/O paths. As such, each of the I/O operations may be forwarded from the application 104 to the data storage system 120 over one of the possible multiple I/O paths. The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included a commercially available product such as, for example, Dell EMC™ PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical data storage devices, such as device 130, where each such physical device may be configured to store data of one or more LUNs. Each of the LUNs having data stored on the device 130 may be configured to be accessible to the host system 102 through one or more I/O paths. For example, all LUNs of 130 may be accessible using ports of the three front-end directors or interfaces 122a-122c, also denoted respectively HA1, HA2 and HA3. The multiple I/O paths allow the application I/Os to be routed over multiple I/O paths and, more generally, allow the LUNs of device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LUNs of the device 130 in order to determine which of the multiple I/O paths are active or available at a point in time, which of the multiple I/O paths are unavailable for communications, and to use such information to select an I/O path for host system-data storage system communications.

In the example of the system 100, each of the LUNs of the device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LUNs of the device 130 may be accessible over three I/O paths—a first I/O path represented by A1-B1, a second I/O path represented by A2-B2 and a third I/O path represented by A3-B3.

FIG. 4 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 4 provides further detail regarding various software layers that may be used in connection with the MP driver 106 of FIG. 3. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host system may perceive as corresponding to a physical device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 3. More generally, one or more layers between the application layer 121 and the MP driver 106, for example, the file system 123, may provide for mapping a LUN (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LUN known or exposed to the host system may not directly correspond to a physical device such as a disk drive. In such embodiments, the LUN specified by the host system in the I/O operation may be further mapped by the data storage system using its mapping layer 127. For example, a LUN specified by the host system may be mapped by the data storage system to one or more physical drives, and multiple LUNs may be located on a same physical device, multiple physical drives, and the like.

The MP driver 106, as well as other components illustrated in FIG. 4, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LUNs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-I/O commands such as related to host system control operations. I/O operations may include, for example, read and write operations with respect to data stored on a LUN.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 3) and a second endpoint which is a port of an HA (e.g., such as B1-B3 of FIG. 3) in the data storage system. Through each such I/O path, one or more LUNs may be visible or exposed to the host system initiator through the target port of the data storage system.

In some embodiments of the invention, the data storage system may provide a multi-tenant (MT) environment whereby multiple tenants store their data on the data storage system. In such an illustrative MT environment, a different service level may be specified for each tenant, and the service level may define one or more performance objectives (e.g., SLOs) for one or more performance metrics for the tenant. For example, the performance objective specified for the tenant may include an average response time (ART) with respect to I/Os issued by the tenant. To further illustrate, a performance objective may specify an ART of 3 milliseconds (ms) for the tenant whereby the tenant is guaranteed to have an ART of 3 ms for each LUN storing the tenant's data. The tenant also may be referred to as a consumer of the data storage system having its data stored on the data storage system. One or more application running on a host system may correspond to a tenant. A performance objective for a tenant may apply to all applications on a host system corresponding to a tenant, or less than all (e.g., one or more) applications.

In some cases, different performance objectives may be defined for one or more different applications of the same tenant. For example, a certain higher-level performance objective may be defined for more mission critical time-sensitive applications, e.g., an application related to equity transactions, whereas a lower-level performance objective may be defined for less mission critical applications, for example, email. Further, it should be noted that different performance objectives may be defined for different applications on a single-tenant system. For example, a storage system may be used exclusively by a single entity (e.g., customer) who is thus the only tenant on the storage system, but the entity may establish performance priority between multiple applications using performance objectives. The performance objectives may be tied to contractual arrangements (e.g., service level agreements (SLAs)) between the customer and the owner of administrator of the storage system, and the customer may pay more for a higher performance objective, all other factors being the same. In some embodiments multiple LUNs may be grouped together in a logic construct called a storage group (SG), which may be logically associated with a specific application and/or specific tenant, and a performance objective may be specified for the SG, and thus indirectly associated with an application.

Additionally, although examples and illustrations herein may refer to a RT specified as a performance objective, it should be noted that a performance objective may be specified using one or more other metrics other than RT. For example, I/O related performance objectives may be specified in terms of guaranteed I/O throughput (e.g., I/O rate such as I/Os per second), data throughput (e.g., megabytes per second), and the like. A performance objective, such as the RT performance objective described herein, may be applied on a per-LUN level (e.g., guaranteed for each LUN individually).

If a performance objective is not being met, i.e., when measured or observed performance is worse than as specified by the performance objective metric, for example, when the average measured or observed RT exceeds a performance objective-specified RT, such an occurrence may be referred to herein as a performance objective violation. A performance objective violation may be defined as obtaining a second value for a performance metric, such as ART, based on observed or measured performance values where the second value deviates more than a threshold amount from a specified performance objective value for the performance metric. For example, the performance objective may specify an ART of 3 ms. A performance objective violation may be defined to be a deviation from the ART of 3 ms (as determined from observed or measured RT values) of more than 0.5 ms. That is, a performance objective violation may be determined if the ART based on such measured performance is outside of an RT range of 3 ms+/−0.5 ms or outside the inclusive range of 2.5 ms-3.5 ms. The deviated amount (e.g., 2.5 ms) may be specified as a percentage of the specified performance objective metric value 3 ms, or as a numeric quantity (e.g., real number). It should be appreciated that a performance objective violation also may occur if the measured or observed performance is better than as specified in the performance objective. For example, if the inclusive range of ART specified by a performance objective is 2.5 ms-3.5 ms, an ART of 2.0 ms is actually a shorter response time, i.e., a better performance, but still a violation of the performance objective.

In known systems, responsive to a performance objective violation, remediation processing may be performed to attempt to alleviate, and, if possible, eliminate, the performance objective violation. Any suitable technique may be used to remove the performance objective violation. For example, remediation processing may be performed to increase I/O performance of an application when the measured RT is greater than the specified performance objective RT. For example, if an SG of LUNs has a measured ART of 5 ms and a performance objective of 3 ms, processing may be performed to increase performance of I/Os directed to such LUNs of the SG such as by allocating additional resources for use by the I/Os directed to the SG LUNs, storing or moving the data of the SG LUNs on higher performance physical storage (e.g., migrating or movement of the LUN data to flash-based storage devices), increasing processing priority of pending I/Os directed to such SG LUNs (e.g., giving such pending I/Os directed to the SG LUNs higher priority relative to priority of other pending I/Os directed to other SGs), and the like.

FIG. 5 illustrates an example of a data structure 500 for associating I/O storage processing behavior with application instances and/or control groups, according to embodiments of the invention. Other embodiments of a data structure for associating I/O storage processing behavior with application instances and/or control groups, for example, variations of data structure 500, are possible and are intended to fall within the scope of the invention. While in some embodiments of the system described herein, data structure 500 is a table, it should be appreciated that the invention is not so limited. Other types of data structures, for example, object-oriented data structures, may be used. Data structure 500 may be created, stored, maintained and utilized on a host system, and may be referred to herein as an "instance control table" or "control table," and more specifically as a "host instance control table" or "host control table." The instance control table 500 may be created and modified by a host administrator or other user, and configured to be used by one or more components of a host system, for example, the MP driver 106 of the host system 102, to tag host I/O requests with the appropriate instance control ID, as described in more detail elsewhere herein.

As is described in more detail elsewhere herein, a host system (e.g., 102) may communicate the host control table 500 (and other data structures described herein) to one or more storage systems (e.g., 120), which then may use the information contained in the table 500 to control I/O storage processing behavior of I/O operations for host application instances and/or control groups. As such, the control table 500 may be considered as a contract or agreement between the host system and a storage system about how to process I/O operations for host application instances and/or control groups.

Host control table 500 may include a plurality of entries 510, each entry 510a-510f representing an application instance. Each entry 510a-510f may include a value for one or more fields corresponding to a respective column 502-508, including any of: control group ID column 502, application instance ID column 503, application instance type column 504, instance control ID column 505, priority column 506, other behavior column 507, other information column 508, and other columns.

Each application instance ID field of an entry 510 may specify an identifier (e.g., name) of the application instance it represents. The application instance ID may be any of: an ID (e.g., name) of a VM, container or the like, an OS process name; a user-defined name, another type of ID, or any suitable combination of the foregoing, which may be gleaned from the host OS or other controlling software running directly on the host hardware. For example, an Oracle database application running on a host may be configured to produce OS process names that reflect the application I/O process (e.g., LOGWRITER or DBWRITER) and the control group (or other type of group) who generated the instance of the process (e.g., Marketing or Sales); i.e., process names: LOGWRITER_SALES, LOGWRITER_MKTG, DBWRITER_SALES and DBWRITER_MKTG, and these process names may be adopted as application instance IDs.

Each instance control ID field 505 of an entry 510 may specific an ID for the application instance represented by the entry. For example, in entry 510a, the instance control ID="1". The instance ID must specify a unique value with respect to the host. Any type of value may be used, and the number of unique instance control IDs that may be used may vary and may be configured based on any of a variety of factors. For example, as described in more detail elsewhere herein, after the host control table 500 has been communicated to one or more storage systems, the host system may tag I/O communications (i.e., requests) sent to one or more storage systems with instance control IDs. Such I/O communications may be configured according to known protocols, such as SCSI, and such tagging may be accomplished by specifying the instance control ID in a field of a SCSI command description block (CDB). The size (i.e., number of bits) of the CDB field or any I/O communication field used to communicate the control instance ID may dictate the number of potential unique values that may be specified. For example, if the I/O communication field is 4 bits in length, then up to 16 values may be specified, one of which (null or 0) may be used indicate that no instance control ID is specified, leaving 15 other unique values (e.g., "1"-"F" in hexadecimal) that may be used for instance control IDs. Thus, in embodiments in which only 4 bits are used to communicate control instance IDs, only 16 different application instances having unique instance control IDs may be specified in the host control table 500. It should be appreciated, however, that in some embodiments of the system described herein, rather than specifying unique instance control IDs for application instances, multiple application instance may have a same control ID, which may be specific to a control group to which the application instance. That is, instance control IDs may be unique to control groups, rather than application instances, as is described elsewhere herein in more detail.

In some embodiments, the host control table 500 may include one or more columns for specifying behavior values, for example, priority column 506 and other behavior column 507. Priority column 506 enables a priority value to be specified for each entry in the host control table 500, which may be used to establish priority between host application instances. A host system and/or storage system may be configured to associate this priority value, and thus translate it into any of a variety of I/O storage processing behaviors coordinated between the host and one or more storage systems such as, for example: read and/or write response times (and specify variants thereof), other performance behaviors, caching, tiering (e.g., promotion and demotion), replication, backup, migration, other I/O storage processing behaviors, and any suitable combination of the foregoing. Any of these behaviors may be explicitly specified for an entry in one or more other behaviors columns 508. For example, the entry 510e for application instance="HR Production" (HR meaning "Human Resources") specifies a priority value="2" and another behavior value of "snap," which means to perform snapshots on data of the HR Production application instance. In addition, a priority value in the priority column 506 may correlate to a service level defined between a host system and/or storage system, or one of these service levels may be explicitly specified in one of the other behavior columns 507 and these service level themselves may correlate to one or more I/O storage processing behaviors. For example, a host system and/or a storage system may be configured to implement a predefined number of service levels, for example, "diamond," "platinum," "gold," "silver" and "bronze," or "1"-"5" and each of these service levels may define one or more performance objectives, e.g., SLOs, for one or more performance metrics. For example, a performance objective specified may include an average response time (ART) with respect to I/O requests.

Each entry 510 may specify any of a variety of other information corresponding to the application instance in the one or more other information columns 508 such as, for example: additional information about the application that spawned the instance (e.g., vendor, version, etc.), associated performance level objectives (e.g., SLOs), one or more application and/or host system administrators or other personnel associated with the application instance, other information, or any suitable combination of the foregoing.

It should be appreciated that in some embodiments of the system described herein, control groups are not employed, in which case the host control table 500 may not include the control group ID column 502 and the control group type column 504. In other embodiments, application instances may be grouped together in control groups, in which case each entry 510a-f may include a control group ID in the column 502 identifying the control group to which the application instance represented by the entry belongs, and may include a control group type in the column 504.

In embodiments in which control groups are used, the control group type field of an entry 510 may specify the type of control group in the control group type column 504. For example, a control group may be user-defined, a VM, a container, or another type of controller. A VM or container type means that the entry represents a VM or container, respectively. In some embodiments, from the perspective of an instance control table and I/O processing performed in association therewith, a VM, container or other discrete, virtualized, self-executable software package may be considered and treated as an application instance. For example, in some embodiments, the host OS (or other controlling software running directly on the host hardware) may identify each VM or container as a single process or thread running on the host OS. In such cases, the host OS, and thus the MP driver or other host component creating the instance control table and/or using it to tag I/O (described in more detail elsewhere herein), may have no visibility into what actual applications are running inside the VM or container, and no visibility into what application within the VM or container issued an I/O request. That is, in such embodiments, the OS or the like views VMs and containers as it views processes for application instances running independent of a VM or container. In such embodiments, for an entry representing the VM or container in the instance control table 500 that includes a logical group ID column 502, the same VM or container ID (e.g., name) may be specified in the instance control table for both the control group identifier and application instance identifier; or only one of these fields may be populated with the VM or container ID, and the system may be configured to understand this to mean that the entry is for a VM or container. For example, entry 510f includes the same control group ID and application instance ID="HR Backup."

A user-defined type of control group is a control group for which the membership of application instances is user-defined; i.e., not constrained to an independently created VM, container or the like. For example, entries 510c and 510d are for the "Marketing" control group, which is a user-defined control group including application instances "LOGWRITER_MKTG" and "DBWRITER_MKTG," respectively.

The number of entries 510 that may be specified in the host control table 500 may vary and may be configured based on any of a variety of factors. For example, as described in more detail elsewhere herein, the number of unique instance control IDs may be constrained to a certain number, for example, based on a size of a field being used to communicate the instance control ID in I/O communications from a host system to a storage system. In embodiments in which instance control IDs are unique to each application instance (e.g., when instance control IDS are not shared by members of a control group), the number of entries 500 may be limited to the number of unique instance control IDs (e.g., 15 if a 4-bit field is used, as described elsewhere herein). In embodiments in which control groups are used, an instance control group ID may be specified and shared by all members of a storage group, in which case the number of entries 500 in the control table 500 is not limited to the number of unique instance control IDs available.

In some embodiments of the invention, an index may be provided that maps application instance IDs to instance control IDs. For example, FIG. 6 illustrates an example of a data structure 600 for indexing instance control IDs based on application instance IDs, according to embodiments of the invention. Other embodiments of a data structure for indexing instance control IDs based on application instance IDs, for example, variations of the data structure 600, are possible and are intended to fall within the scope of the invention. The data structure 600 (which may be referred to herein as "control ID index") may include an application instance ID column 603 and an instance control ID column 605, corresponding to application instance ID column 503 and an instance control ID column 505 of the host control ID table 500. The control ID index may include a plurality of entries 610 corresponding to entries 510 of the control ID table 500. Such a data structure may be used, for example, by an MP driver, when processing I/O requests to determine (e.g., lookup) an instance control ID to tag to an I/O communication sent to a storage system, as described elsewhere herein in more detail.

Control Groups enable behavior to be defined collectively for a group of application instances. In some embodiments, even though control groups are employed, it may be desirable to define I/O storage processing behavior at the granularity of application instances; i.e., specifically for application instances. For example, in the host control table 500, application instances "LOGWRITER_SALES" and "DBWRITER_SALES" specified in the entries 510a and 510b are both members of the "Sales" control group, but have unique instance control IDs, "1" and "2" respectively, specified in the instance control ID column 505.

Figure 7:
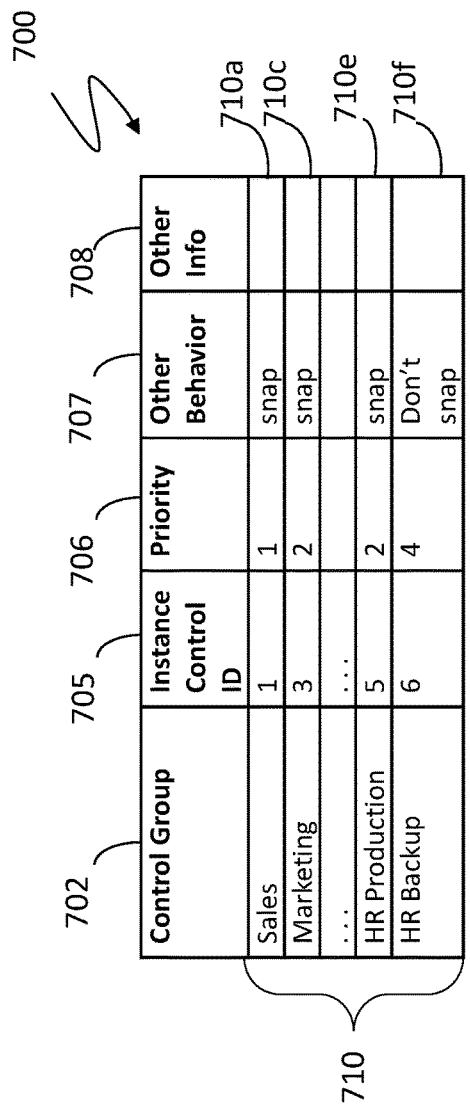
FIG. 7 illustrates an example of a data structure for associating I/O storage processing behavior with control groups, according to embodiments of the invention.

In some embodiments in which control groups are employed, a single instance control ID may be used for all members of the control group. In such embodiments, one or more data structures may be used in addition, or as an alternative, to host control table 500 and control ID index 600. For example, FIG. 7 illustrates an example of a data structure 700 for associating I/O storage processing behavior with control groups, according to embodiments of the invention, which may be referred to herein as a "control group-based control table." Other embodiments of a data structure for associating I/O storage processing behavior with control groups, for example, variations of the control group-based control table 700, are possible and are intended to fall within the scope of the invention. Control group-based control table 700 may include a plurality of columns 702, 705, 706, 707 and 708 corresponding to the columns 502, 505, 506, 507 and 508 of the control table 500. However, rather than having entries corresponding to application instances as in the control table 500, each of entries 710*a*, 710*c*, 710*e* and 710*f* represent control groups, specify values specific to such control groups in the instance control column 705, priority column 706, one or more other behavior columns 707 and one or more other information columns 708. For example, the entry 710*c* specifies an instance control ID of "3," a priority of "2," and behavior value of "snap" for the control group "Marketing."

Figure 8:
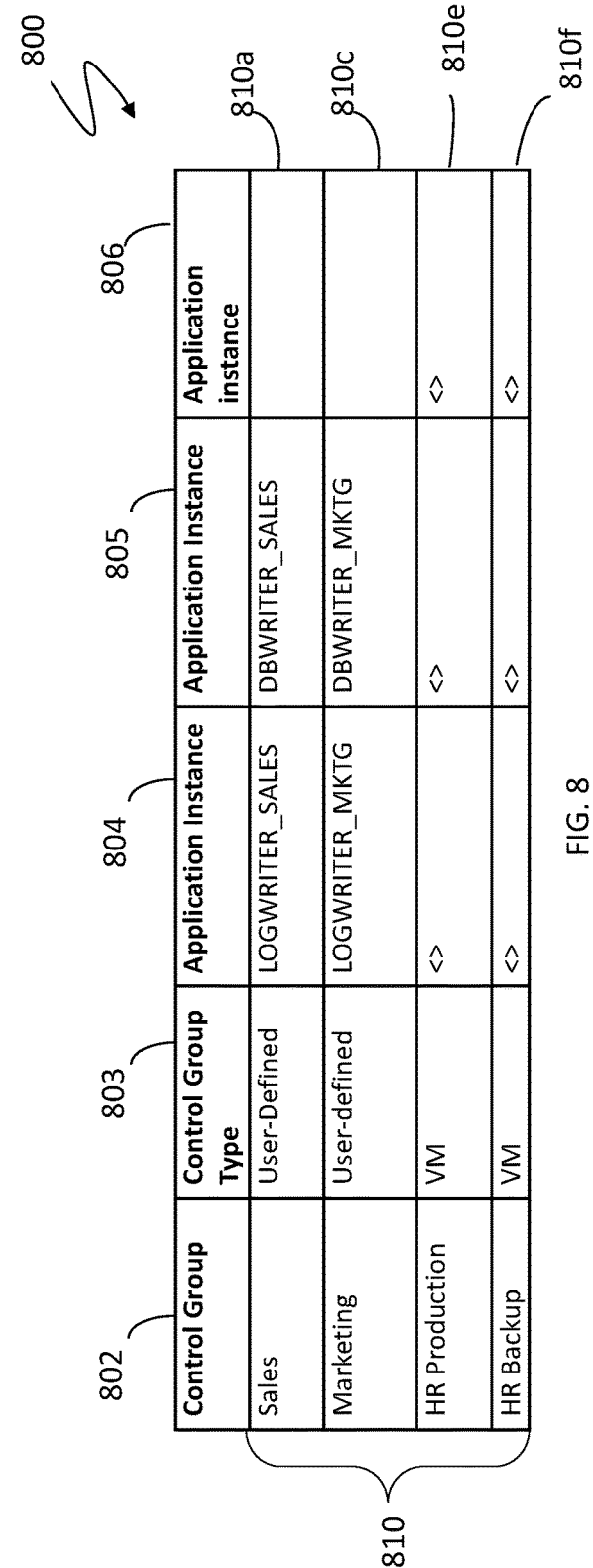
FIG. 8 illustrates an example of a data structure for associating application instances with control groups, according to embodiments of the invention.

In embodiments of the system described herein in which a single instance control ID is used for all members of the control group, and the control group-based control table 700 is employed, another data structure may be used to associate application instances with control groups. For example, FIG. 8 illustrates an example of a data structure 800 for associating application instances with control groups, according to embodiments of the invention, which may be referred to herein a "control group table." Other embodiments of a data structure for associating application instances with control groups, for example, variations of the control group table 800, are possible and are intended to fall within the scope of the invention. The data structure 800 may include a plurality of columns, including control group ID column 802, control group type column 803, and one or more application instance columns 804-806. The control group column 802 may be used to specify a control group ID with each entry 810*a*, 810*c*, 810*e* and 810*f* of the plurality of entries 810. The control group type column 802 may be used to specify a control group type for the control group of each entry of the entries 810, and each of the one or more application instance columns may be used to specify an application instance ID for an application instance that is a member of the control group represented by an entry of the entries 810. For example, the entry 810*a* indicates that "LOGWRITER_SALES" and "DBWRITER_SALES" are members of the "Sales" control group. It should be appreciated that for some control groups, e.g., VM-type control groups "HR Production" and "HR Backup" of entries 810*e* and 810*f*, respectively, do not have any application instances specified in columns 804-806 for reasons that should be clear from the description of VM-type control groups provided elsewhere in.

Figure 9:
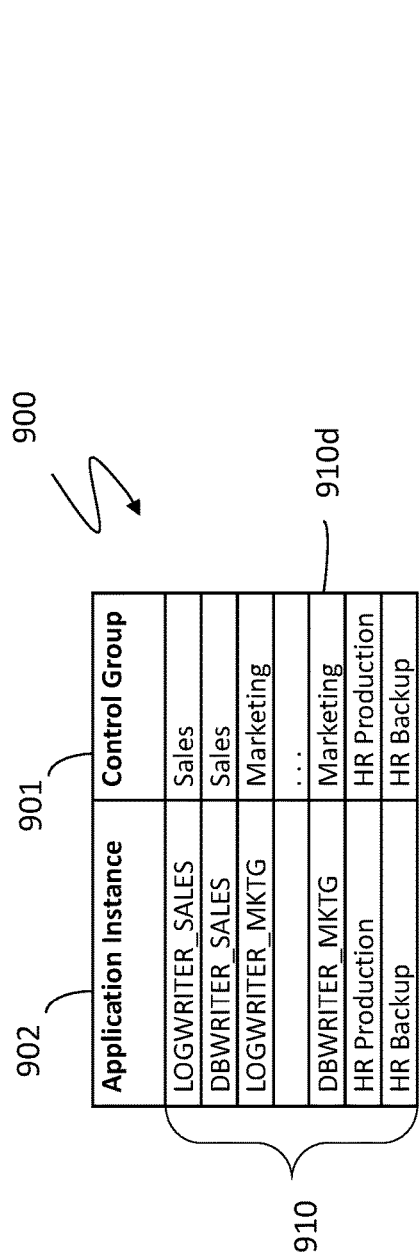
FIG. 9 illustrates an example of a data structure for indexing control groups based on application instances IDs, according to embodiments of the invention.

In embodiments of the system described herein in which a single instance control ID is used for all members of the control group, in addition to providing a control group-based control table 700 and a control group table 800, another data structure may be provided to map control groups to application instances IDs. For example, FIG. 9 illustrates an example of a data structure 900 for indexing control groups based on application instances IDs, according to embodiments of the invention, which may be referred to as a "control group index." Other embodiments of a data structure for indexing control groups based on application instances IDs, for example, variations of the control group index 900, are possible and are intended to fall within the scope of the invention. The control group index may have a plurality of entries 910 representing application instances, which are identified in the application instance ID column 902, the control group ID of the control group to which each specified application instance belongs being specified in the control group ID column. The control group index 900 may be used to determine a control group for an application instance. For example, entry 910*d* may be used to determine that the application instance "DBWRITER_MKTG" belongs to the control group "Marketing."

In embodiments of the system described herein in which a single instance control ID is used for all members of the control group, the combination of the control group index 900 and control group table 700 may be used to determine the instance control ID and/or one or more behavior values associated with an application instance. For example, from entry 910*d*, it may be determined that the application instance "DBWRITER_MKTG" belongs to the control group "Marketing." The control group ID "Marketing" then may be used as a key to the entry 710*c* in the control group table 700 to determine that the instance control ID for "Marketing" is "3." Thus, the control group index 900 and control group table 700 may be used to determine the instance control ID for an application instance of an I/O request. In some embodiments, the instance control ID may be populated using the control group index 900 and control group table 700 to determine the instance control ID for an application instance as described above.

It should be appreciated that the data structures 500-900 are not limited to being used for associating I/O storage processing behaviors with application instances. These data structures may be used for any of a variety of purposes on a host system, for example, to associate host-side I/O processing and/or other types of processing (e.g., compute, networking) with control groups and/or application instances. For example, one or more of data structures 500-900 may be used to prioritize allocation of compute (e.g., OS or CPU) resources to application instances on a host system. Further, it should be appreciated that one or more of the data structures 500-900 may be based on, derived from or copied from existing data structures or other logical entities on a host system (e.g., VMs or containers), which were defined for, and may already be used for, managing resources on a host system.

As described in more detail elsewhere herein, a host system (e.g., 102) may communicate the host control table 500 (and any of data structures 600-900) to one or more storage systems (e.g., 120), which then may use the information contained in the table 500 to control I/O storage processing behavior of I/O operations for host application instances. For example, the storage system may create its own control table from the communicated host control table 500. FIG. 10 illustrates an example of a data structure 1000 for associating I/O storage processing behavior with host application instances, according to embodiments of the invention. Other embodiments of a data structure for associating I/O storage processing behavior with host application instances, for example, variations of data structure 600, are possible and are intended to fall within the scope of the invention. While in some embodiments of the system described herein, data structure 1000 is a table, it should be appreciated that the invention is not so limited. Other types of data structures, for example, object-oriented data structures, may be used. Data structure 1000 may be referred to herein as a "storage system control table" or more generally as a "control table" or "instance control table."

The storage system control table 1000 may include a plurality of entries 1010, each entry 1010*a*-1010*i* representing an application instance. Each entry 1010*a*-1010*i* may include a value for one or more fields corresponding to: host ID column 1001, instance control ID column 1005, priority column 1006, other behavior column 1007, other information column 1008, the latter four columns of which may correspond to columns 505, 506, 507 and 508 of the host control table, respectively. For each entry 1010*a*-1010*i*, the host ID column may be used to specify the host system corresponding to the entry, as the storage system may be serving multiple host systems and receive instance control tables from each of them. For example, entries 1010*a*-1010*f* may correspond to entries 505*a*-505*f* of the control host table 500, such that the host ID specified in column 1001 for these entries is the ID (e.g., name) of the host system that created the host control table 500. In the illustrative example of FIG. 10, the name of this host system is "First Floor Server," which may be descriptive of the location of the host system within an office building, for example, of a tenant of the storage system. The entries 1010*g*-1010*i* specify "Second Floor Server" in the host ID column 1001, meaning that these entries are applicable to, and may have been communicated by, a host system having this name, which may be descriptive of the location of the host system within the office building, for example, of the tenant of the storage system.

The storage system instance control table 1000 may include some or all of the information included in the host instance control table 500, and may include additional information, for example, host IDs in the host ID column 1001 and perhaps additional behavioral values and other information for entries in on or more other behavior columns 1007 and one or more other information columns 1008. A user, e.g., a storage administrator, may decide what other information to include in each entry of the storage system control table 1000. For example, it may be desirable to include information about the application or one or more application or host administrators associated with the application instance identified by the instance control ID in each entry. This other information may have been included in the communicated host control table 500 or obtained from other sources.

It should be appreciated that one or more data structures other than data structures 500-1000 may be used to control I/O storage processing of I/O operations based on application instance and/or control group, for example, data structures that are variations of, or derived from, data structures 500-1000.

Figure 11:
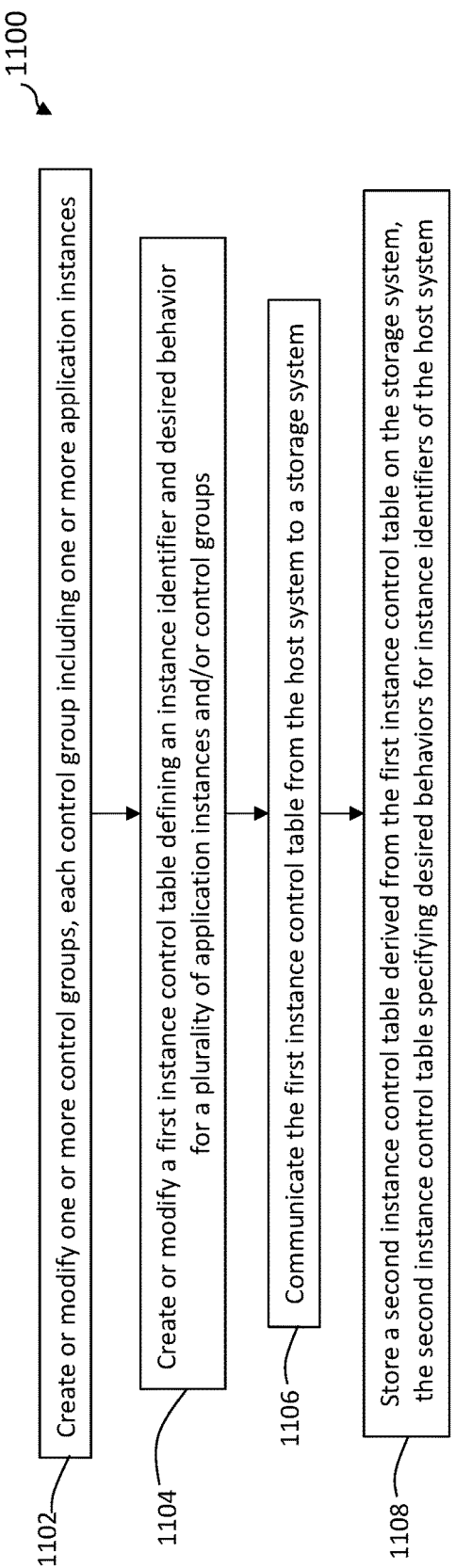
FIG. 11 is a flowchart illustrating an example of a method of associating I/O storage processing behavior with application instances, according to embodiments of the invention.

FIG. 11 is a flowchart illustrating an example of a method 1100 of associating I/O storage processing behavior with application instances, according to embodiments of the invention. Other embodiments of associating I/O storage processing behavior with application instances, for example, variations of method 1100, are possible and are intended to fall within the scope of the invention. Method 1100 and/or portions thereof may be implemented using one or more components of the systems and/or data structures described above in relation to FIGS. 1-10.

In a step 1102, one or more control groups may be created or modified to include one more application instances, for example, in embodiments of the inventions in which control groups are used. For example, the step 1102 may include creating or modifying one more entries in the control group table 700. For example, an entry in the control group table 700 may be modified each time it is determined that a new instance of an application (e.g., a new process name) will be (or already has been) spawned on a host system. The known name of the application instance (e.g., the process name) may be used as the application instance ID in the control group table 700. The host group table also may be modified for other reasons, for example, to regroup application instances to adjust their I/O processing behavior accordingly.

In a step 1104, a first instance control table (e.g., the host control table 500) defining an instance identifier and desired behavior for a plurality of application instances and/or control groups may be created or modified. For example, a new entry in the first instance control table may be created each time it is determined that a new instance of an application (e.g., a new process name) will be (or already has been) spawned on a host system. The known name of the application instance (e.g., the process name) may be used as the application instance ID in the first instance control table. The first instance control table also may be modified for other reasons, for example, to adjust the I/O processing behavior of one or more application instances.

In some embodiments, method 1100 may include creating or modifying one or more other data structures in addition to the control group table 700 and host control table 500, for example, the data structures 600, 800 and 900 described in more detail herein in relation to FIGS. 6, 8 and 9.

In a step 1106, the first instance control table may be communicated from the host system to the storage system, for example, from one of ports A1, A2 and A3 of the host system 102 (e.g., a port of an HBA) to one of the ports B1, B2 and B3 of an HA of the data storage system 120.

In a step 1108, the storage system may store a second instance control table (e.g., the storage group control table 1000) derived from (e.g., based on or copied from) the first instance control table on the storage system, for example, in a global memory (e.g., 26) or the local memory of one or more directors of the storage system (e.g., one of directors 37*a*-37*b* of data storage system 20*a*). The second instance control table may specify desired behaviors for instance identifiers for the host system, for example, as described in more detail elsewhere herein.

It should be appreciated that the method 1100 and/or one or more steps thereof may be performed more than once, for example, each time one of the control group table 700 and/or instance control table 500 is modified, in response to an event (e.g., a user editing) or at predetermined times (e.g., daily).

Figure 12:
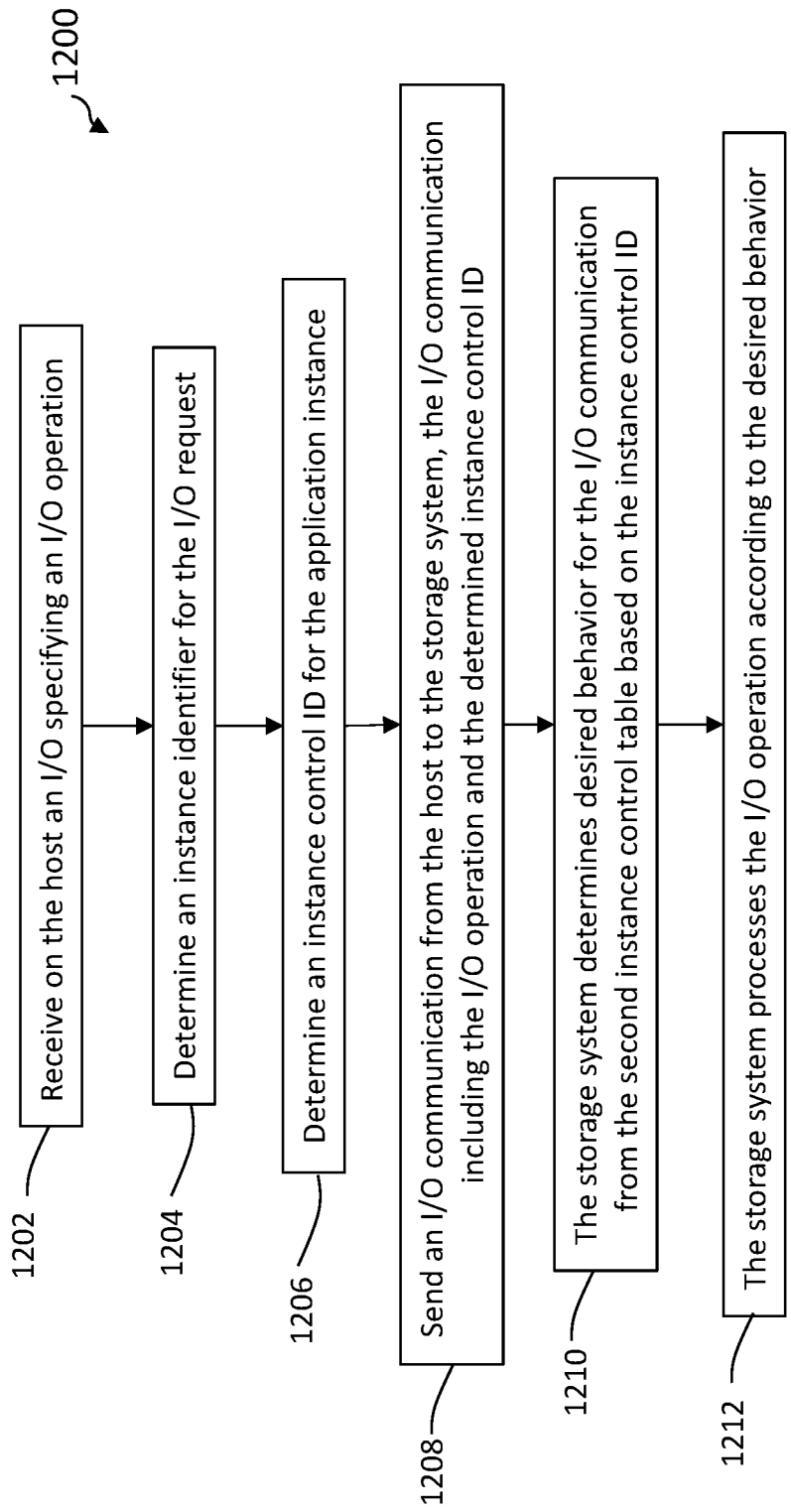
FIG. 12 is a flowchart illustrating an example of a method of processing I/O operations for an application instance according to I/O storage processing behavior associated with the application instances, according to embodiments of the invention.

FIG. 12 is a flowchart illustrating an example of a method 1200 of processing I/O operations for an application instance according to I/O storage processing behavior storage processing behavior associated with the application instances, according to embodiments of the invention. Other embodiments of processing I/O operations for an application instance according to I/O storage processing behavior storage processing behavior associated with the application instances, for example, variations of method 1200, are possible and are intended to fall within the scope of the invention. Method 1200 and/or portions thereof may be implemented using one or more components of the systems or data structures described above in relation to FIGS. 1-10.

In a step 1202, an I/O request for an application instance is received on the host, the I/O request specifying an I/O operation. For example, a read operation for the application instance named "DBWRITER_SALES" may be received from an Oracle application on host system 102. In the step 1204, an instance identifier for the I/O request is determined, for example, from the process name executing on host OS or other controlling software running directly on the host hardware.

In a step 1206, an instance control ID may be determined for the application instance, for example, by referencing the control ID index 600 or the control table 500 (or other data structures 700-900 as described in more detail elsewhere herein), from which it may be determined that the instance control ID for "DBWRITER_SALES" is "2."

In a step 1208, an I/O communication may be sent from the host system to the storage system, the I/O communication including the I/O operation and the determined instance identifier, for example, from one of ports A1, A2 and A3 of the host system 102 (e.g., a port of an HBA) to one of the ports B1, B2 and B3 of an HA of the data storage system 120. That is, the I/O communication may be tagged with the determined instance identifier and sent to the storage system. Such I/O communications may be configured according to one or more known protocols, such as SCSI, and such tagging may be accomplished by specifying the instance control ID in a field of a SCSI command description block (CDB). The host system (e.g., 102) and the storage system (e.g., 120) may be configured to use the same field (e.g., of the CDB) of the I/O communication, which may be of any of a variety of sizes and formats, for example a 4-bit hexadecimal field.

In the step 1210, the storage system may determine desired behavior for the I/O communication from an instance control table based on the instance control ID. For example, the host system (e.g., 102) may be named "First Floor Server," and using this host name and the control instance ID="2," the storage system (e.g., 120) may access the entry 1010b in the storage system control table 1000 to determine that the priority for the I/O operation="1," that snapshots should not be taken for this application instance, and perhaps other information.

In the step 1212, the storage system may process the I/O operation according to the desired behavior. For example, the storage system may treat the I/O operation as a priority-1 operation, which may correlate to a certain service level, and may be associated with certain performance objectives, for example, a certain average response time. The storage system also may not take snapshots for data associated with the application instance of the I/O operation.

While embodiments of the system described herein control I/O storage processing behavior based on application instance, it should be appreciated that the system is not so limited. In some embodiments, I/O storage processing behavior may be based on control groups, not application instances, except in the sense that application instances are members of the control groups. For example, in such embodiments, the control group-based control table 700 may be the only data structure of data structures 500-900 communicated to the storage system, and the storage system may create a control table based on the communicated control-group based control table 700. During I/O processing, the host system may determine the control group-based instance ID for an I/O request by determining the application instance of the I/O request, and then use data structures 700-900 to determine the control group-based instance control ID, as described in more detail elsewhere herein. The determined instance control ID then may be tagged to an I/O communication for the I/O request sent to the storage system, and the storage system may use the instance control ID to access its own control group-based control table and process the I/O request according to the behavior specified for the instance control ID in such table.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100 and/or 1200, or parts thereof, may be implemented using one or more of the systems and data structures described in relation to FIGS. 1-9 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system including a storage system and at least one host system having a plurality of instances of applications executing thereon, a method comprising:
   associating a desired I/O behavior with each application instance, the I/O behavior specifying a desired manner in which I/O operations for the application instance will be processed on the system; and
   for each of the plurality of application instances, controlling processing of I/O operations for the application instance on the storage system based on the desired I/O behavior associated with the application instance.

2. The method of claim 1, wherein the system further includes a plurality of logical groupings of one or more of the plurality of application instances,
   wherein, for the one or more application instances, the desired I/O behavior is associated with the application instance based at least in part on the logical grouping of which the application instance is a member.

3. The method of claim 2, wherein one or more of the logical groupings corresponds to a container or virtual machine.

4. The system of claim 1, wherein associating a desired I/O behavior includes associating a priority with each application instance.

5. The method of claim 1, wherein associating a desired I/O behavior with each application instance includes creating a first table including a plurality of entries, each entry corresponding to one of the application instances and specifying the desired I/O behavior.

6. The method of claim 1, wherein each application instance is associated with the respective desired I/O behavior on the at least one host system, the method further comprising:
   communicating the association of application instances with the respective desired I/O behaviors to the storage system.

7. The method of claim 6, the method further comprising:
   receiving on the first host system an I/O request for a first of the plurality of application instances, the I/O request specifying an I/O operation;
   determining a value corresponding to the association of the first application instance and the respective desired I/O behavior of the first application instance; and sending an I/O communication from the at least one host to the storage system, the I/O communication including the I/O operation and the determined value.

8. The method of claim 7, further comprising:
the storage system determining the respective desired I/O behavior from the communicated value; and
the storage system processing the I/O operation according to the respective desired I/O behavior.

9. For a computer network including a storage system and at least one host system having a plurality of instances of applications executing thereon, a system comprising:
one or more processors; and
a memory comprising code stored thereon that, when executed, performs a method comprising:
associating a desired I/O behavior with each application instance, the I/O behavior specifying a desired manner in which I/O operations for the application instance will be processed on the system; and
for each of the plurality of application instances, controlling processing of I/O operations for the application instance on the storage system based on the desired I/O behavior associated with the application instance.

10. The system of claim 9, further comprising:
a plurality of logical groupings of one or more of the plurality of application instances,
wherein, for the one or more application instances, the desired I/O behavior is associated with the application instance based at least in part on the logical grouping of which the application instance is a member.

11. The system of claim 9, wherein associating a desired I/O behavior with each application instance includes creating a first table including a plurality of entries, each entry corresponding to one of the application instances and specifying the desired I/O behavior.

12. The system of claim 9, wherein each application instances is associated with the respective desired I/O behavior on the at least one host system, the method further comprising:
communicating the association of application instances with the respective desired I/O behaviors to the storage system.

13. The system of claim 12, the method further comprising:
receiving on the first host system an I/O request for a first of the plurality of application instances, the I/O request specifying an I/O operation;
determining a value corresponding to the association of the first application instance and the respective desired I/O behavior of the first application instance; and
sending an I/O communication from the at least one host to the storage system, the I/O communication including the I/O operation and the determined value.

14. The system of claim 13, further comprising:
the storage system determining the respective desired I/O behavior from the communicated value; and
the storage system processing the I/O operation according to the respective desired I/O behavior.

15. One or more non-transitory computer-readable media for a system including a storage system and at least one host system having a plurality of instances of applications executing thereon, the computer-readable medium having software stored thereon comprising:
executable code that associates a desired I/O behavior with each application instance, the I/O behavior specifying a desired manner in which I/O operations for the application instance will be processed on the system; and
executable code that, for each of the plurality of application instances, controls processing of I/O operations for the application instance on the storage system based on the desired I/O behavior associated with the application instance.

16. The one or more computer-readable media of claim 15, wherein the system further includes a plurality of logical groupings of one or more of the plurality of application instances, and
wherein, for the one or more application instances, the desired I/O behavior is associated with the application instance based at least in part on the logical grouping of which the application instance is a member.

17. The one or more computer-readable media of claim 15, wherein the executable code that associates a desired I/O behavior with each application instance includes executable code that creates a first table including a plurality of entries, each entry corresponding to one of the application instances and specifying the desired I/O behavior.

18. The one or more computer-readable media of claim 15, wherein which each application instance is associated with the respective desired I/O behavior on the at least one host system, the software further comprising:
executable code that controls communicating the association of application instances with the respective desired I/O behaviors to the storage system.

19. The one or more computer-readable media of claim 18, the software further comprising:
executable code that controls receiving on the first host system an I/O request for a first of the plurality of application instances, the I/O request specifying an I/O operation;
executable code that determines a value corresponding to the association of the first application instance and the respective desired I/O behavior of the first application instance; and
executable code that controls sending an I/O communication from the at least one host to the storage system, the I/O communication including the I/O operation and the determined value.

20. The one or more computer-readable media of claim 19, the software further comprising:
executable code that determines, on the storage system, the respective desired I/O behavior from the communicated value; and
executable code that controls, on the storage system, processing the I/O operation according to the respective desired I/O behavior.

* * * * *